(12) United States Patent
Rai et al.

(10) Patent No.: US 7,812,847 B2
(45) Date of Patent: Oct. 12, 2010

(54) METHOD AND APPARATUS FOR PROVIDING BANDWIDTH PRIORITY

(75) Inventors: Barinder Singh Rai, Surrey (CA); Phil Van Dyke, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 712 days.

(21) Appl. No.: 11/734,969

(22) Filed: Apr. 13, 2007

(65) Prior Publication Data

US 2008/0252648 A1  Oct. 16, 2008

(51) Int. Cl.
*G06T 1/60* (2006.01)

(52) U.S. Cl. ............... 345/530; 345/531; 345/535; 345/543; 345/558; 345/559

(58) Field of Classification Search .............. None
See application file for complete search history.

(56) References Cited

U.S. PATENT DOCUMENTS

| | | | |
|---|---|---|---|
| 4,860,248 A | | 8/1989 | Lumelsky |
| 5,029,105 A | | 7/1991 | Coleman et al. |
| 5,727,139 A | | 3/1998 | Owen et al. |
| 5,949,428 A | | 9/1999 | Toelle et al. |
| 6,002,412 A | * | 12/1999 | Schinnerer .......... 345/558 |
| 6,259,459 B1 | | 7/2001 | Middleton |
| 6,278,645 B1 | | 8/2001 | Buckelew et al. |
| 6,388,241 B1 | | 5/2002 | Ang |
| 6,741,257 B1 | | 5/2004 | Retika |
| 6,753,872 B2 | | 6/2004 | Moriwaki et al. |
| 2003/0142058 A1 | * | 7/2003 | Maghielse .......... 345/98 |
| 2005/0195902 A1 | * | 9/2005 | Chung .......... 375/240.25 |
| 2006/0022985 A1 | * | 2/2006 | Shepherd et al. .......... 345/535 |

FOREIGN PATENT DOCUMENTS

| | | |
|---|---|---|
| JP | 6019675 | 1/1994 |
| JP | 9230850 | 9/1997 |

* cited by examiner

*Primary Examiner*—Ulka Chauhan
*Assistant Examiner*—Donna J Ricks
(74) *Attorney, Agent, or Firm*—Mark P. Watson

(57) ABSTRACT

A memory for a graphics processor is provided. The memory includes a write first-in-first-out (FIFO) region of the memory for receiving pixel data, and a read FIFO region for accessing the pixel data received into the memory through the write FIFO. The memory has a memory controller having write assembly logic for rearranging the pixel data received by the write FIFO for storage in the memory. The write assembly logic is configured to write data representing a first pixel and a second pixel across a plurality of data segments in the memory, where corresponding bit locations for the data representing the first pixel and the data representing the second pixel are contiguous. A graphics controller having the memory and a method for preventing data corruption from being displayed during an underflow are included.

13 Claims, 9 Drawing Sheets

METHOD AND APPARATUS FOR PROVIDING BANDWIDTH PRIORITY

CROSS REFERENCE TO RELATED APPLICATIONS

This Application is related to application Ser. No. 11/735,002 entitled "Method and Apparatus for Bandwidth Corruption Recovery," and application Ser. No. 11/734,972 entitled "Self-Automating Bandwidth Priority Memory Controller." These applications are herein incorporated by reference in their entireties for all purposes.

BACKGROUND

As hand-held battery powered devices are incorporating more and more functionality, the memory integrated into the graphics processor of the devices is being accessed by multiple functional blocks. With all these memory accesses, the memory at times may be unable to support a display pipe that is feeding a display panel for presenting the image data. Especially with the ubiquitous nature of camera functionality incorporated into cell phones, and the additional functionality to go along with the camera capability, the memory is becoming accessed more and more and must support numerous input/output devices. If the situation occurs where the memory does not have the bandwidth to support the display pipe, the image data displayed on the display panel may appear corrupted.

One attempt to prevent the corruption from being displayed is to incorporate oversized display buffers within the device. However, this approach still may not prevent the buffer under run in certain instances and corruption may occur within the display panel. Furthermore, the costs associated with the increased size for the display pipe, as well as real estate concerns within the device, make this an undesirable solution. Accordingly, there is a need to prevent corrupted data from being displayed without having an oversized display pipe.

SUMMARY

Broadly speaking, the present invention fills these needs by providing a technique for storing pixel data in memory and accessing the data in a manner that avoids the presentation of any corrupt data on the display panel as a result of a buffer under run. It should be appreciated that the present invention can be implemented in numerous ways, including as a process, an apparatus, a system, a device, or a method. Several inventive embodiments of the present invention are described below.

In one embodiment, a method for preventing data corruption from being displayed during an underflow is provided. The method includes writing data representing a first pixel across a plurality of segments within memory and writing data representing a second pixel across the plurality of segments. The corresponding bit locations for the data representing the first pixel and the data representing the second pixel are contiguous. The method includes requesting the data representing the first pixel and reading the data representing the first pixel in response to the requesting. It is determined whether the reading is completed for the first pixel prior to the first pixel being displayed. A portion of the data representing the first pixel is substituted when the reading is not completed prior to a display time for the first pixel. The first pixel is presented with the substituted data portion.

In another embodiment, a graphics controller is provided. The graphics controller has a memory which includes a write first in first out (FIFO) region for receiving original pixel data. The memory also includes a read FIFO region for accessing the original pixel data received through the write FIFO buffer region. The memory includes a memory controller having write assembly logic for rearranging the original pixel data received by the write FIFO buffer region for storage in the memory. The write assembly logic is configured to write data representing a first pixel and a second pixel across a plurality of segments in the memory, wherein corresponding bit locations for the data representing the first pixel and the data representing the second pixel are contiguous. The graphics controller also includes a display pipe for accessing pixel data in the read FIFO region, where the pixel data being reassembled to the original pixel data within the read FIFO region.

In yet another embodiment, a memory for a graphics processor is provided. The memory includes a write first-in-first-out (FIFO) region of the memory for receiving pixel data, and a read FIFO region for accessing the pixel data received into the memory through the write FIFO buffer region. The memory has a memory controller having write assembly logic for rearranging the pixel data received by the write FIFO buffer region for storage in the memory. The write assembly logic is configured to write data representing a first pixel and a second pixel across a plurality of data segments in the memory, where corresponding bit locations for the data representing the first pixel and the data representing the second pixel are contiguous.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

The embodiments described herein provide a technique for rearranging image data within the memory of a graphics engine so that the most significant bits of the image data are stored within a common register while successively less significant bits are stored within other registers in a corresponding pattern. That is, bits representing multiple pixels are stored within common registers in order to prevent a buffer under run, also referred to as an underflow, as described in more detail below. In essence, the data for multiple pixels are stored within a common register or data segment within memory. It should be appreciated that any number of pixel data may be stored within a common register in that the exemplary numbers described herein are not meant to be limiting. Thus, the pixel data may be spread over any amount of bytes. The exact number of bytes over which the pixel data is spread will depend on the implementation.

Figure 1:
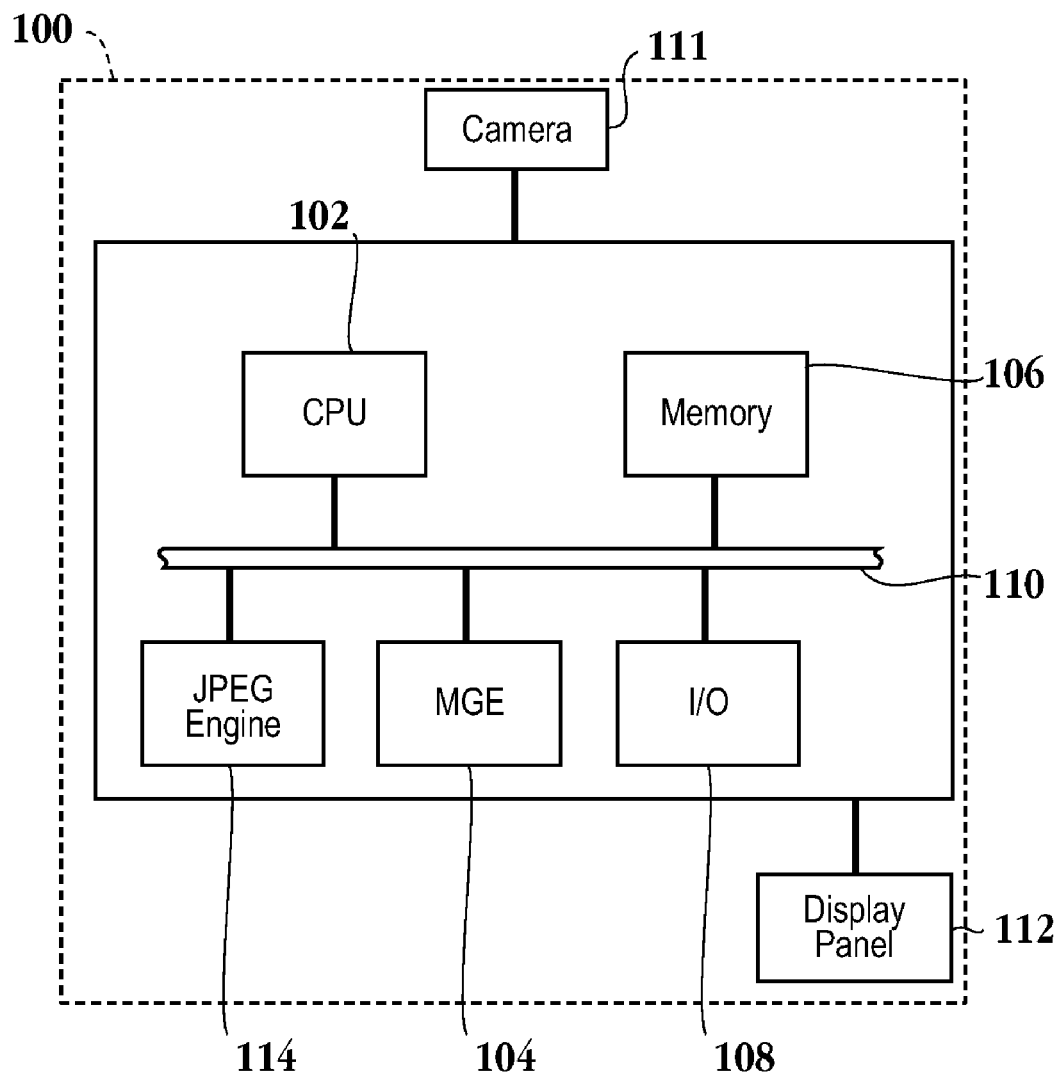
FIG. 1 is a high level simplified schematic diagram of the device having the capability to avoid corruption from being presented on a display panel even when a buffer under flow may occur within a display pipe in accordance with one embodiment of the invention.

FIG. 1 is a high level simplified schematic diagram of the device having the capability to avoid corruption from being presented on a display panel even when a buffer under flow may occur within a display pipe in accordance with one embodiment of the invention. Device 100 includes central processing unit (CPU) 102 and mobile graphics engine (MGE) 104. It should be appreciated that MGE 104 may be referred to as a graphics processing unit or graphics controller. Device 100 further includes system memory 106 and input/output (I/O) block 108. Other functional blocks, such as joint photographics expert group (JPEG) engine 114, may also be included within module 101 of device 100. Each of CPU 102, MGE 104, memory 106, JPEG engine 114, and I/O 108 are in communication with each other over bus 110. One skilled in the art will appreciate that device 100 may be any suitable hand-held portable electronic device, e.g., a cell phone, a personal digital assistant, a web tablet, etc. Device 100 also includes display panel 112 and camera block 111. It should be noted that while display panel 112 and camera block 111 are illustrated as separate entities from module 101, camera block 111 and display panel 112 may be integrated into module 101 in accordance with one embodiment of the invention. Within MGE 104 is logic incorporated into a memory controller for memory within MGE 104, which avoids buffer under flows that may cause pixel corruption in accordance with one embodiment of the invention. In addition, the memory controller within MGE 104 includes prioritization logic which prioritizes requests to the memory of MGE 104 based on the description below.

Figure 2:
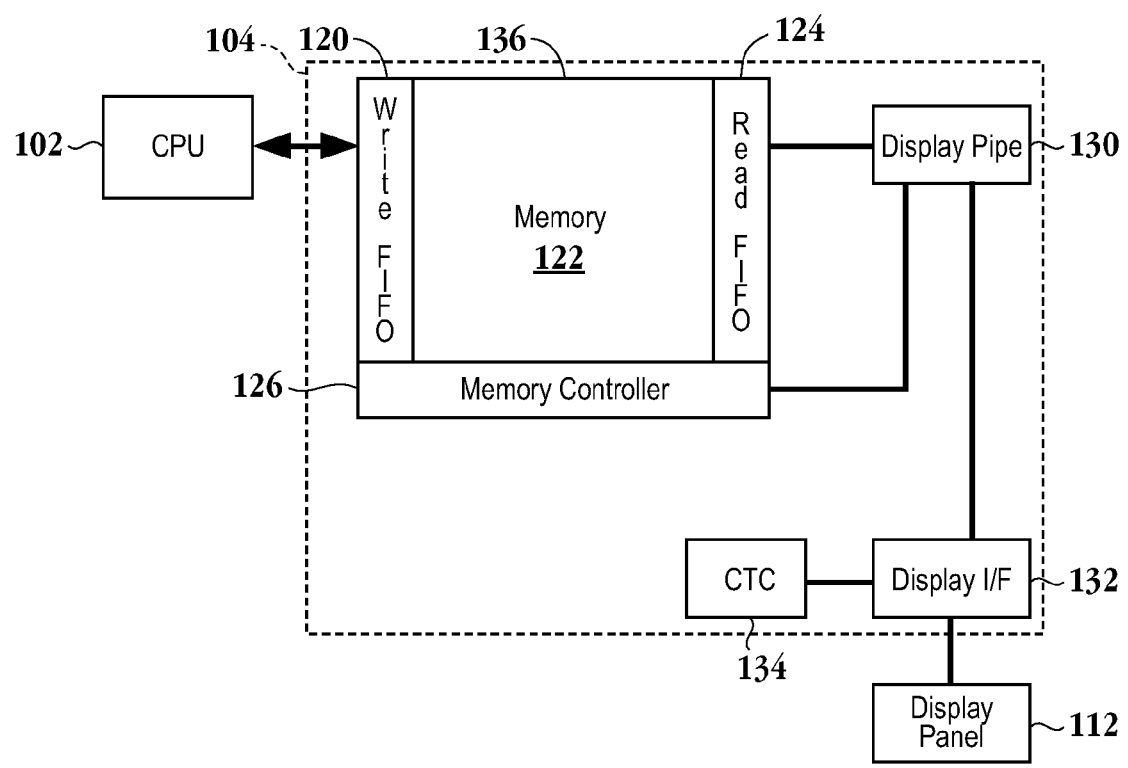
FIG. 2 is a simplified schematic diagram illustrating further details on the memory and memory controller within the mobile graphics engine in accordance with one embodiment of the invention.

FIG. 2 is a simplified schematic diagram illustrating further details on the memory and memory controller within the mobile graphics engine in accordance with one embodiment of the invention. CPU 102 communicates with memory 136 of mobile graphics engine 104. In one embodiment, CPU 102 may be accessing memory 136 in order to write data into memory region 122 while display pipe 130 is requesting access to memory 136. In one embodiment, display pipe 130 may be thought of as a device accessing memory. Display pipe 130 will access data within memory region 122 through read first-in-first-out (FIFO) 124. Display pipe 130, which may be a FIFO buffer region in on embodiment, communicates the display data accessed from memory region 122 to display interface 132. Display panel 112 receives the display data through display interface 132. In addition, core timing control (CTC) block 134 provides timing and control signals for communication of display data through display interface 132. Memory 136 within MGE 104 includes write first in first out (FIFO) buffer region 120, memory region 122, read FIFO buffer region 124, memory controller 126 and bandwidth control logic 128. Write FIFO buffer region 120 will act as a staging area for pixel data to be written into memory region 122. For example, if a device is requesting access to write data into memory region 122, the device will place the data within write FIFO buffer region 120 and thereafter the data will be written into memory region 122 as described in more detail below. Likewise, a device requesting access to read data from memory region 122 will read the data from read FIFO buffer region 124 according to the embodiments described below. One skilled in the art will appreciate that access to and from memory 136 is granted through memory controller 126. Memory controller 126 performs a number of functionalities in addition to granting access to memory region 122 as described in more detail with reference to FIG. 3. For example, memory controller 126 includes logic to monitor a lag between data being transmitted to display pipe 130 and data being requested by display interface 132. Memory controller 126 also includes logic for prioritizing between multiple devices accessing memory 122, wherein the access is granted based on a bit position being requested. Memory controller 126 includes write assembly logic and read assembly logic enabling data to be written across a plurality of segments within memory 122 and data to be read from the plurality of segments that the data was written into.

Figure 3:
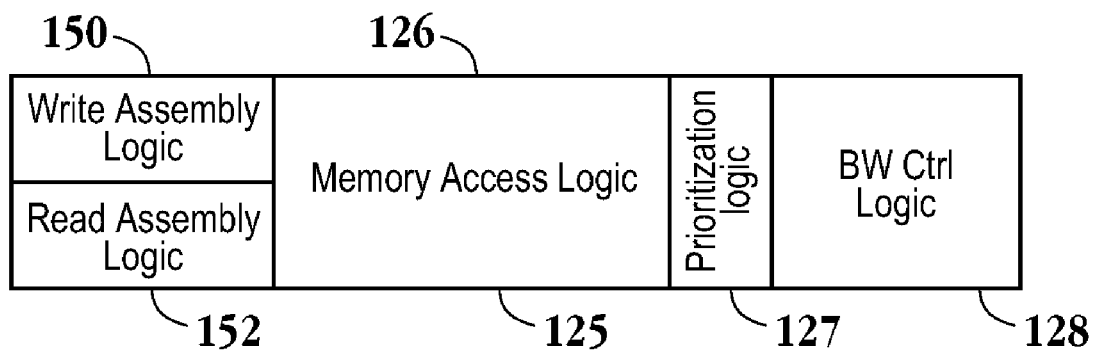
FIG. 3 is a simplified schematic diagram illustrating the logical blocks for a memory controller in accordance with one embodiment of the invention.

FIG. 3 is a simplified schematic diagram illustrating the logical blocks for a memory controller in accordance with one embodiment of the invention. Memory controller 126 includes bandwidth control logic 128, which may also be referred to a bandwidth limiting check module, prioritization logic 127, memory access logic 125, write assembly logic 150 and read assembly logic 152. One skilled in the art will appreciate that the logic described herein may be embodied through a combination of logic gates connected in order to perform the described functionality. Bandwidth control logic 128 will monitor a lag between incoming data and outgoing data from the display pipe in order to prevent corruption from being displayed on a corresponding display panel. In one embodiment, bandwidth control logic 128 monitors requests from the display pipe for data and whether those requests have been acknowledged (ACKed) or not acknowledged (NAKed) by the memory controller. Prioritization logic 127 will prioritize between multiple requests for access into the memory region for which memory controller 126 is controlling. In one embodiment, prioritization logic compares a bit location being requested for any combination of read or write operations and the operation requesting the most significant bit position will be granted access.

In another embodiment, the prioritization logic will perform an additional check on top of the bit location comparison. The additional check may include a priority assigned to the device accessing memory. In the embodiment where a device accessing memory has a higher prioritization than a device which is requesting a more significant bit, the higher priority device will be granted access over the device requesting the more significant bit. Memory access logic 125 contains circuitry which directs requests to an appropriate cell within the corresponding memory region. One skilled in the art will appreciate that conventional memory access logic, typically used for memory controllers may be incorporated into memory access logic 125. Memory controller 126 further includes write assembly logic 150 and read assembly logic 152. As mentioned above, the data is written into the memory across a plurality of data segments or registers within the memory. Thus, the write assembly logic will handle the transmission of the bits to corresponding locations within the registers of data segments within memory. Since the data is written into memory across multiple segments, read assembly logic 152 will gather the corresponding data from the plurality of segments or registers so that a single pixel assembled from corresponding bit positions of the multiple registers, may be transmitted to a corresponding display pipe.

Figure 4:
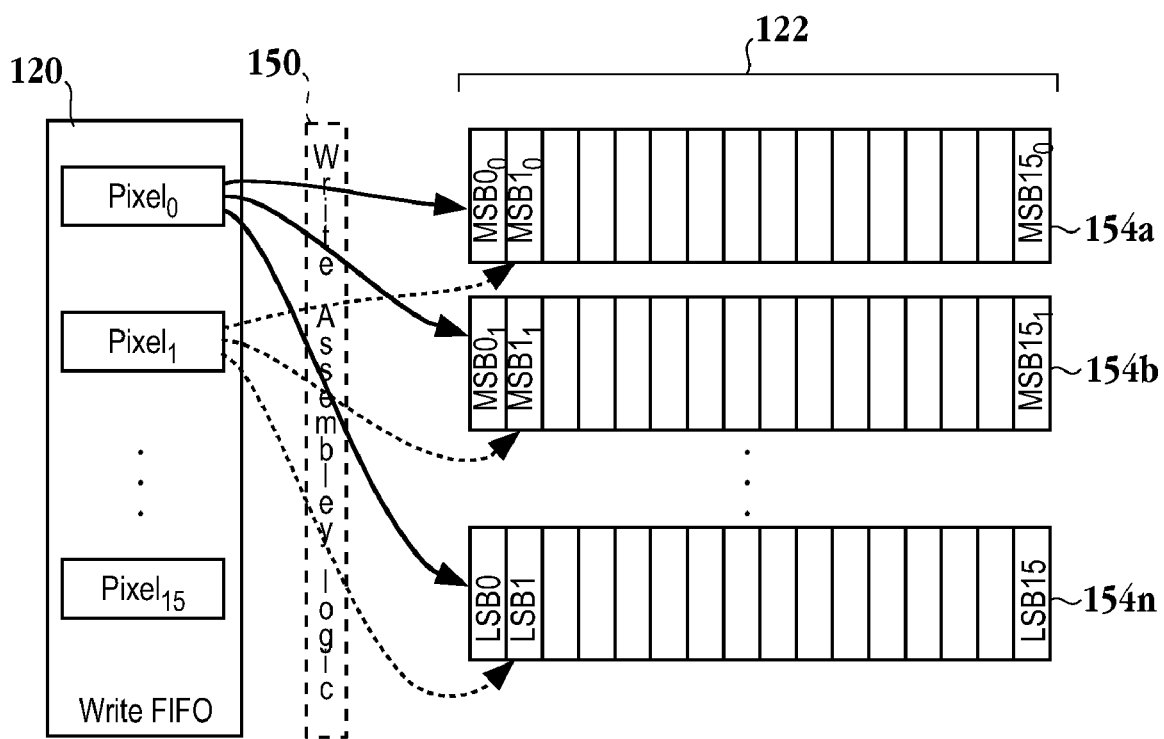
FIG. 4 is a simplified schematic diagram illustrating the technique for writing across multiple data segments in accordance with one embodiment of the invention.

FIG. 4 is a simplified schematic diagram illustrating the technique for writing across multiple data segments in accordance with one embodiment of the invention. In write FIFO buffer region 120 there is a plurality of pixels. For exemplary purposes, 16 pixels, i.e., $pixel_0$ through $pixel_{15}$ are illustrated. In this embodiment, each pixel contains 16 bits of data. That is, the pixels are 16 bits per pixel (bpp). Write assembly logic 150 will transmit the corresponding bits to respective locations within registers of memory 122. Thus, in one embodiment where one bit of pixel data is input to each data segment within memory region 122, memory region 122 will contain 16 data segments or registers having one segment with all the most significant bits from the 16 pixels within write FIFO buffer region 120 and successive data segments with the next most significant bit from each of the pixel within write FIFO buffer region 120. Thus, data segment 154*a* includes each most significant bit from $pixel_0$ through $pixel_{15}$ respectively. Data segment 154*b* includes the next most significant bit from $pixel_0$ through $pixel_{15}$, respectively, and data segment 154$_n$ includes the least significant bit from each of the pixels within write FIFO buffer region 120. One skilled in the art will appreciate that any number of bits may be written into each of the data segments within memory 122. Thus, where two pixels worth of data share a data segment rather than the 16 pixels worth of data illustrated in FIG. 4, then the 8 most significant bits will be written into a first portion of the data segment and the 8 most significant bits of the next pixel will be written into the second portion of the data segment. A second data segment will then contain the eight least significant bits from the corresponding two pixels. It should be noted that numerous combinations of bits to registers are possible and the examples provided herein are not meant to be limiting. As illustrated, the number of pixels represented in a data segment is equal to the number of pixels stored within write FIFO buffer region 120 in one embodiment. It should be noted that data segments 154*a* through 154*n* may be embodied as registers which can contain 16 bits worth of data to coincide with the 16 bpp. Of course, other sized registers may also be used in other embodiments. In addition, the registers may be thought of as contiguous memory data segments in another embodiment although the data segments need not be contiguous and may be offset from each other in memory. However, it should be appreciated that successive pixel data points are stored in a contiguous nature in accordance with one embodiment of the invention. That is, the most significant bit from $pixel_0$ is contiguous with or adjacent to, the most significant bit from pixel, and so on as illustrated in FIG. 4.

Figure 5:
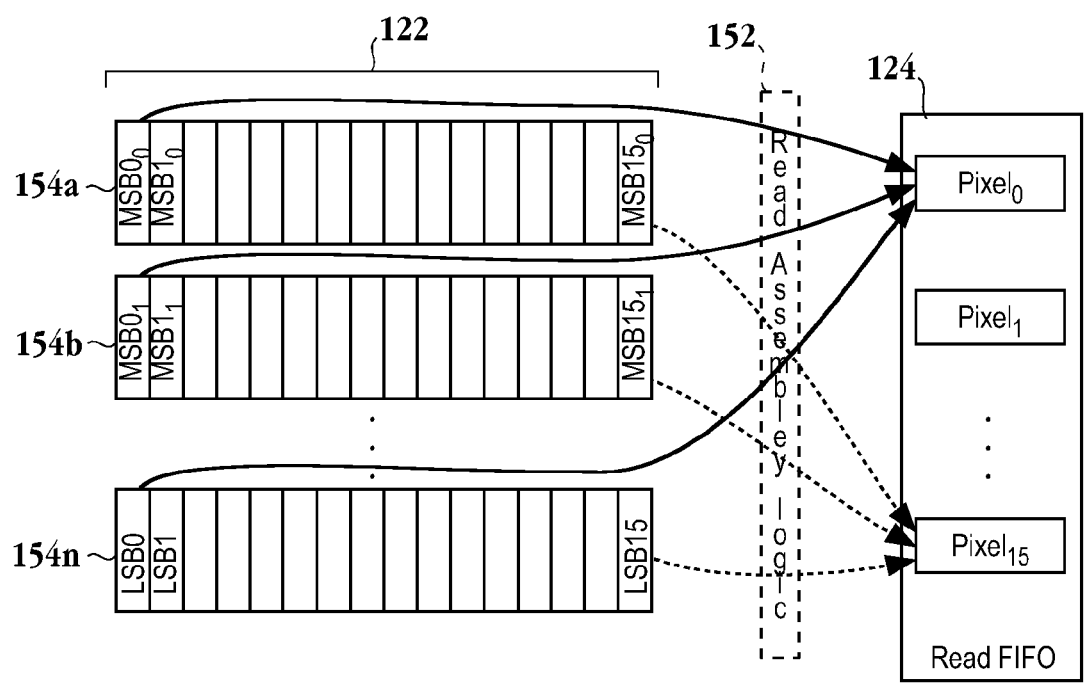
FIG. 5 is a simplified schematic diagram illustrating the read assembly logic for accessing data which has been stored according to the embodiment described in FIG. 4.

FIG. 5 is a simplified schematic diagram illustrating the read assembly logic for accessing data which has been stored according to the embodiment described in FIG. 4. As mentioned previously, since the data is stored across multiple data segments for a single pixel, the data must be reassembled as a complete pixel in order to be read by a device or display pipe. Since each data segment contains a single bit of data for each pixel, read assembly logic 152 will access and assemble each bit for a pixel from the plurality of data segments. Thus, the most significant bit for $pixel_0$ is accessed from data segment 154*a*, while the next most significant bit is read from a corresponding bit position of data segment 154*b*, and so on, until the least significant bit for $pixel_0$ is accessed from a corresponding bit position of data segment 154*n*. This is performed for each pixel to assemble the 16 pixels within read FIFO buffer 124. Here again, the 16 bit per pixel example is not meant to be limiting. That is, any number of pixels may be stored within read FIFO buffer region 124. In addition, multiple bits from a same pixel may be stored within a data segment and memory 122, as the embodiments are not limited to a single pixel being stored within each data segment for different pixels. One skilled in the art will appreciate that through a combination of logic gates within write assembly logic 150 and read assembly logic 152, the functionality for writing the data across multiple data segments and reading the data from the multiple data segments may be achieved. The configuration of the logic gates is arranged to achieve the implementation desired, i.e., different logic combinations would be used to achieve writing data from 16 pixels into a register, as opposed to 12, 8, 4, or 2 pixels into a register. As mentioned above, pixel data from any number of pixels may be stored within a register. For example, as described above 16 different bits from 16 different pixels can be stored within one 16 bit register. In another embodiment, 8 bits from 2 different pixels may be stored within the register. It should be noted that numerous other combinations as far as bits of pixel data and the number of pixels represented by the bits, are possible.

Figure 6:
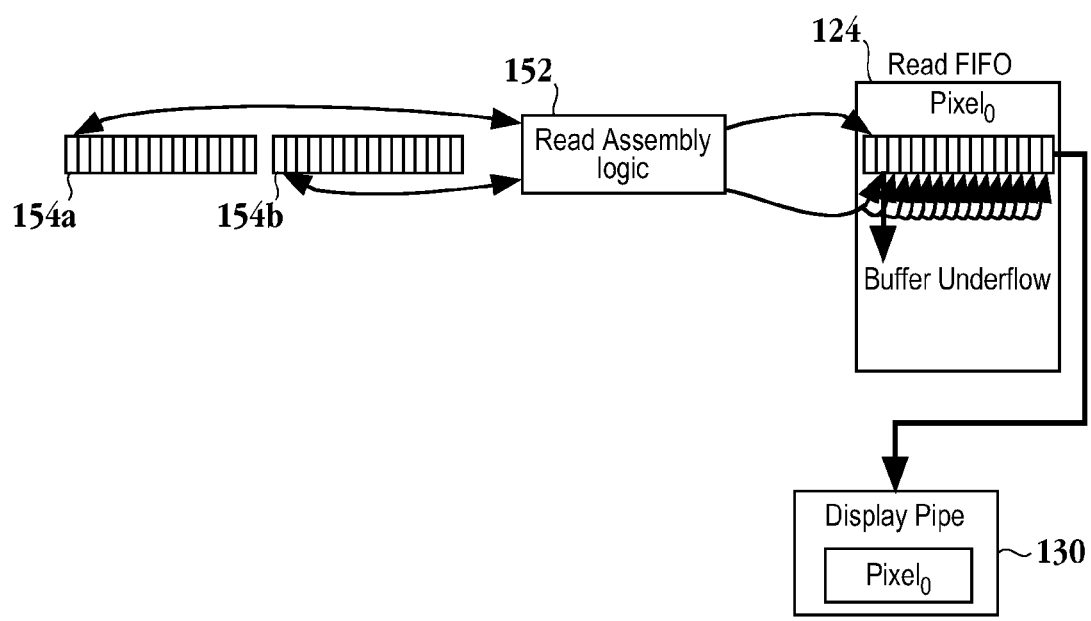
FIG. 6 is a simplified schematic diagram illustrating a buffer under flow condition and the substitution technique in order to prevent corruption from being displayed on a display panel in accordance with one embodiment of the invention.

FIG. 6 is a simplified schematic diagram illustrating a buffer under flow condition and the substitution technique in order to prevent corruption from being displayed on a display panel in accordance with one embodiment of the invention. The embodiments described above rearrange storage of data and memory so that a portion of pixel data is stored across multiple segments. It should be appreciated that this technique assists in avoiding a loss of pixel data. That is, as the pixel is being reassembled from the multiple segments within memory, if a buffer under flow condition should occur, a portion of the pixel data will have been recreated or reassembled, rather than the entire pixel data not being available. In one embodiment, the most significant bits of the pixel data will be reassembled and one skilled in the art will appreciate that the most significant bits typically include the most valid part of the pixel data. Thus, the pixel data may be recreated with the actual most significant bits and substitution pixels utilized for lesser significant bits. In FIG. 6, memory 122 includes data segments 154*a* and 154*b*. Read assembly logic 152 will access the bits for $pixel_0$ and assemble the $pixel_0$ within read FIFO 124. For exemplary purposes, the embodiments described above, where 16 bits of pixel data from 16 different pixels are stored in each pixel segment 154*a* and 154*b*, are used to explain the substitution technique. The most significant bit for $pixel_0$ is read from data segment 154*a* and then the next most significant bit for $pixel_0$ is read from a corresponding bit location of pixel segment 154*b*. Thus, the most significant bit, i.e., bit 15, and the next most significant bit, i.e., bit 14, are assembled in read FIFO 124. After this point, a buffer underflow may occur due to a higher priority device accessing memory or a higher bit portion of memory being accessed. In any event, because of the buffer underflow, data corruption may be perceived on a display panel associated with display pipe 130, which is provided data from read FIFO 124. In order to prevent the corruption from being displayed, the embodiments described herein will recognize the buffer underflow condition and substitute pixel data for any necessary pixel data that has not been obtained. It should be appreciated that the bandwidth control logic referred to in FIG. 2 may monitor the display pipe in order to identify a buffer underflow condition. In one embodiment, the bandwidth control logic described in application Ser. No. 11/735, 002 may be integrated into the memory controller to provide the monitoring of the display pipe in order to identify an under flow condition. In recognition of this condition, the bandwidth control logic will trigger the substitution of pixel data for the corresponding required bits that are needed to define an entire pixel. Thus, after bit 14 has been stored in $pixel_0$ of read FIFO 124 and the buffer underflow condition is recognized, logic within the memory controller will copy the last stored bit from $pixel_0$ in one embodiment. Thus, bit 14 is replicated for bit positions 0 to 13 of $pixel_0$ in read FIFO buffer region 124. Thereafter, $pixel_0$ is fetched by display pipe 130 for display on a corresponding display panel. As mentioned above, any number of implementations may be used for the storage of the pixel data across multiple data segments within memory 122. For example, in an embodiment where two pixels are stored within a single data segment in memory 122, the buffer underflow may occur after a first portion of the pixel is read into read FIFO buffer 124. In this case, 8 bits of the 16 bits that define $pixel_0$ will have been fetched and the remaining 8 lower significant bits will be replicated as described above. As illustrated in these embodiments, the most significant bit portion of the pixel data is captured while the lower significant bit portion is replicated. This leads to a more accurate representation of the pixel data, as opposed to not having any bit portions of the pixel available. While the embodiments described above refer to replication or copying of the last received bit, other embodiments may incorporate averaging and determining a direction of increasing or decreasing values within the captured most significant bit portion of the pixel data. In one embodiment, control logic that calculates a running average or trend value may be included in the memory controller, or external to the memory controller, to track the average and/or trend data.

It should be appreciated that embodiments described herein may exclude the write FIFO buffer region and read FIFO buffer region in one embodiment of the invention. In this embodiment, a read/write/modify to memory is performed to achieve the writing and reading from the memory as discussed above. That is, the data is read from memory and that captured data is modified with a new bit and then written back to memory with the new value. Thus, while the embodiments would be more efficient with the incorporation of the write and read buffer regions, these regions are not required.

Figure 7A:
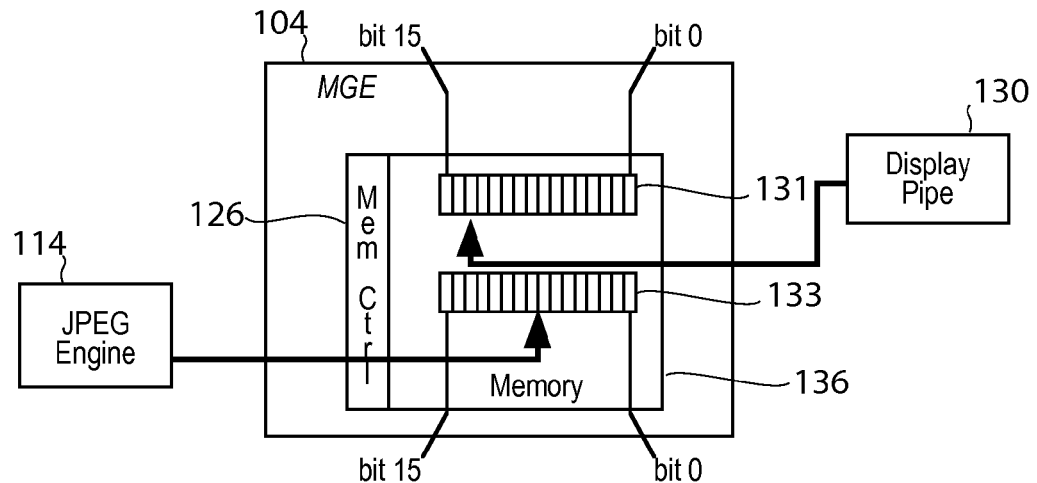
FIGS. 7A and 7B illustrate techniques for prioritizing access to the memory of the MGE based on bit positions being accessed in accordance with one embodiment of the invention.
Figure 7B:
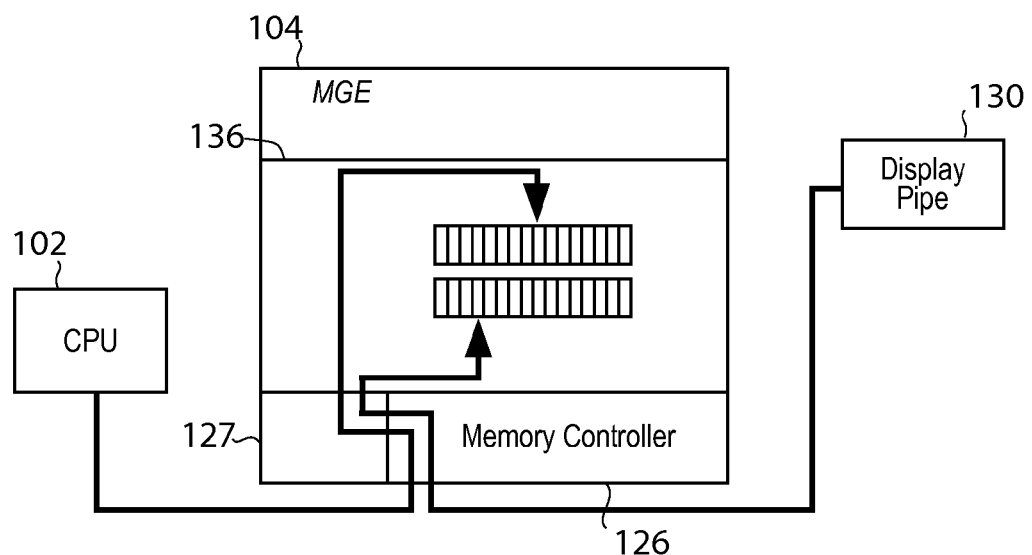

FIGS. 7A and 7B illustrate techniques for prioritizing access to the memory of the MGE based on bit positions being accessed in accordance with one embodiment of the invention. In FIG. 7A, JPEG engine 114 and display pipe 130 are both requesting access to memory 136. Display pipe 130 is requesting access to data segment 131, while JPEG engine 114 is requesting access to data segment 133. In one embodiment, the bit locations being requested will determine which device is granted access to memory first. As display pipe 130 is requesting access to bit 13 of data segment 131 and JPEG engine 114 is requesting access to bit 8 of data segment 133, the access to bit 13 will have a higher priority, as bit 13 is a more significant bit than bit 8. FIG. 7B is an alternative technique to prioritizing the request to memory 136 in one embodiment of the invention. Here, CPU 102 is requesting access to data within memory 136 of MGE 104. Display pipe 130 is also requesting access to memory 136 of MGE 104. Through prioritization logic 127 of memory controller 126, the grant for access is awarded to CPU 102 in this instance. In this embodiment, CPU 102 has a priority assigned to it, as well as does display pipe 130. Thus, in addition to prioritizing based on bit locations being accessed as described above with FIG. 7A, a second level of priority is assigned to the devices accessing memory in the embodiment of FIG. 7B. Since the priority assigned to CPU 102 is higher than the priority assigned to display pipe 130, even though CPU is accessing bit locations having a lower priority than display pipe 130, access is granted to CPU 102. However, if display pipe 130 should enter an underflow condition, substitution logic within memory controller 126 will prevent corruption from being displayed on an associated display panel as described above. It should be appreciated that in the embodiment of FIG. 7B the prioritization logic may compare bit locations being accessed and a flag may be set for devices having a priority assigned thereto. The flag may indicate that a second comparison between the priorities assigned to the devices needs to occur and takes precedence over the priority comparison to the bit locations being accessed. Of course, one skilled in the art will realize that numerous other possibilities exist to implement the comparison of the device priorities. It should be noted that the accesses referred to in FIGS. 7A and 7B may be both write accesses, both read accesses, or a combination of write and read accesses. That is, the embodiments are not limited to a write access and a read access conflicting, but may be any combination of the two.

Figure 8:
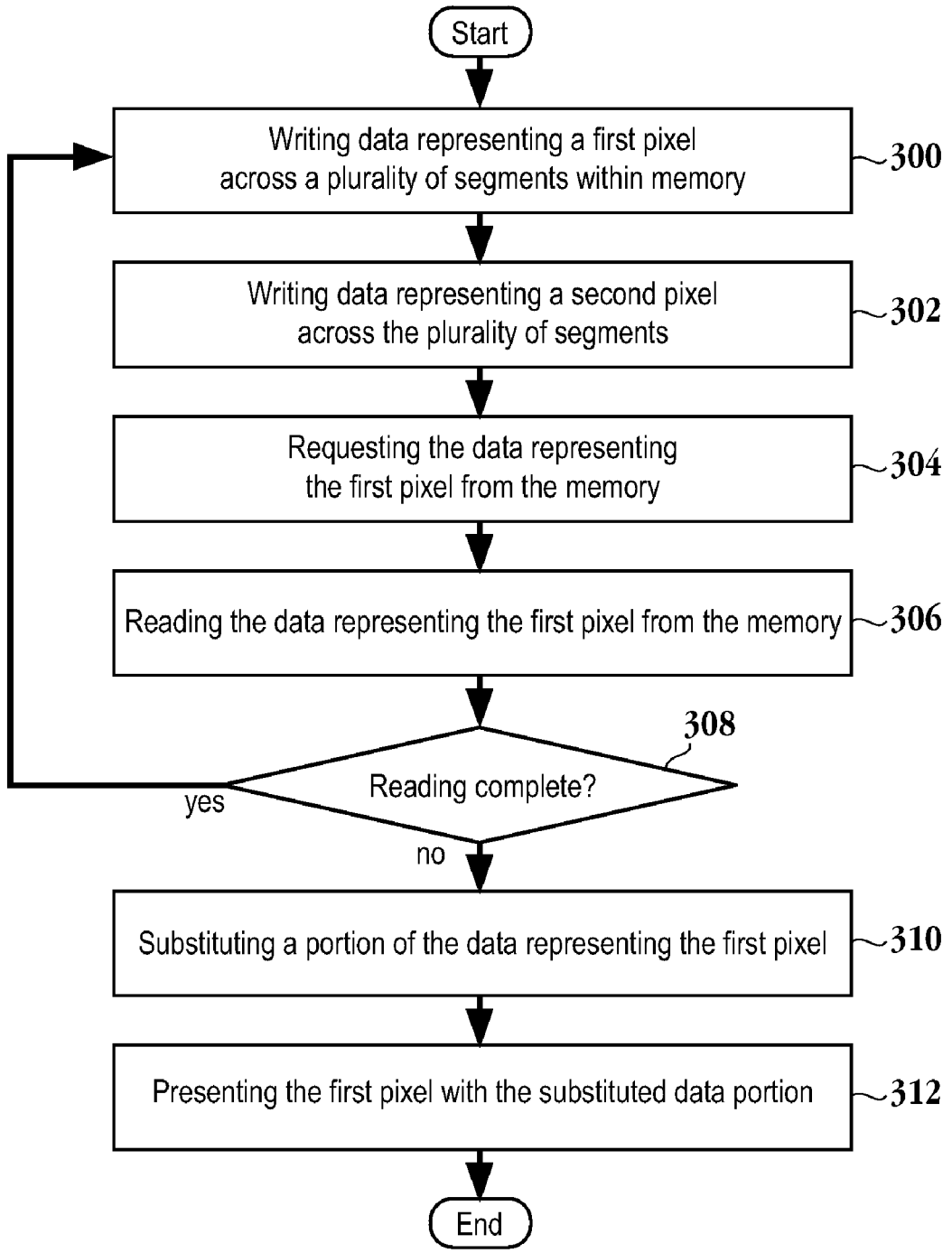
FIG. 8 is a flow chart diagram illustrating the method operations for preventing data corruption from being displayed during an underflow in accordance with one embodiment of the invention.

FIG. 8 is a flow chart diagram illustrating the method operations for preventing data corruption from being displayed during an underflow in accordance with one embodiment of the invention. The method initiates with operation 300 where data representing a first pixel is written across a plurality of segments within memory. As mentioned above, with regard to FIG. 4, the data representing the first pixel may be written across a number of data segments or registers within memory. Where any combination of bits of the first pixel may be written across any number of data segments or registers. The method then advances to operation 302 where data representing a second pixel is written across the plurality of segments within memory. The data representing the second pixel is written across a same number of segments within memory as the first pixel was written across. The method then proceeds to operation 304 where the data representing the first pixel is requested from the memory. In one embodiment a display pipe requests the data for providing that data to a display panel through a display interface as described above. The method then proceeds to operation 306 where the data representing the first pixel is read from the memory. As mentioned above with regard to FIG. 5, read assembly logic will read the data across the plurality of segments within memory so as to reassemble the original pixel value. The method then moves to operation 308 where it is determined if the reading of operation 306 was completed in order to prevent an underflow from occurring in the display pipe. As mentioned above, other devices may be requesting access to memory and this may interrupt the reading or prevent the reading from completing, thereby resulting in the display pipe being partially filled with data. For example, a device having a higher priority may access the memory or a device accessing higher priority bit locations may be accessing the memory and the read operation from operation 306 is paused. Thus, if the read operation has not completed and the entire pixel data is not available to be delivered to the display buffer, the method advances to operation 310 where a portion of the data representing the first pixel is substituted with replacement data. Here, the replacement data may be replication of the last delivered pixel value to the display pipe in one embodiment. In another embodiment, averaging of previously delivered pixel values or averaging of pixel values within the write FIFO buffer region may be implemented for the substitution. If the reading operation has completed in operation 308 the method will return to operation 300 and repeat as described above for a next set of pixel values. From operation 310 the method proceeds to operation 312 where the first pixel having the substituted data is delivered to a display interface and corresponding display panel and presented with the substituted data portion, thereby avoiding any corruption from being displayed on the display panel even though the reading operation did not fetch all of the actual pixel values from memory.

Figure 9:
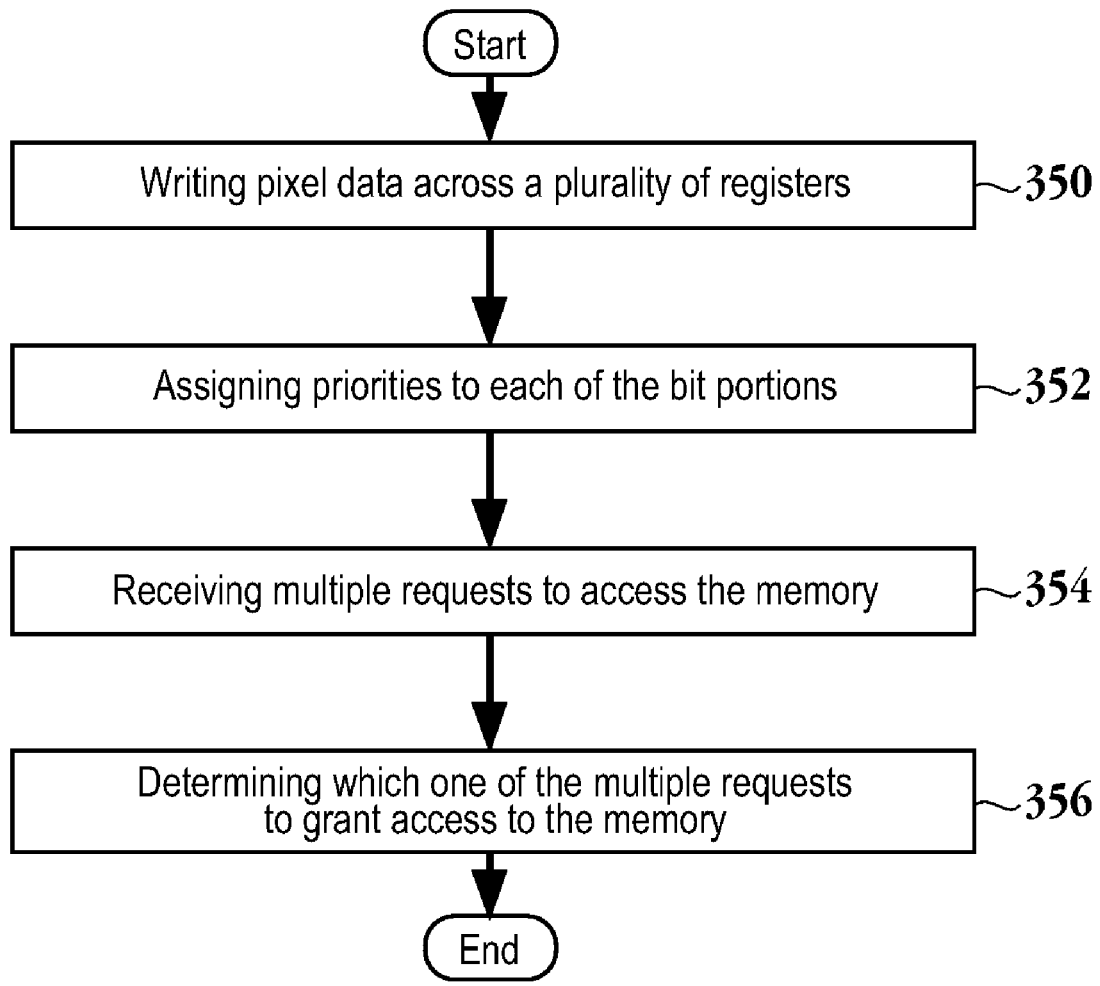
FIG. 9 is a flow chart diagram illustrating the method operations for prioritizing access to a memory in accordance with one embodiment of the invention.

FIG. 9 is a flow chart diagram illustrating the method operations for prioritizing access to a memory in accordance with one embodiment of the invention. The method initiates with operation 350 where pixel data is written across a plurality of registers. In one embodiment corresponding bit portions of pixel data from multiple pixels are stored within one of the plurality of registers. The technique for writing pixel data across the plurality of registers is described above in more detail with regard to FIGS. 4 through 6. The method then proceeds to operation 352 where priorities are assigned to each of the bit portions. In one embodiment, a most significant bit portion has a highest priority and each next less significant bit portion has a next highest priority. Thus, in this embodiment, the most significant bit has a highest priority while the least significant bit has a lowest priority. As mentioned above, in addition to assigning priorities to each of the bit locations, priorities may also be assigned to devices requesting access to memory. In one exemplary embodiment, the priority of the devices requesting access to memory will take precedence over the priority assigned to the bit portions or bit locations. The method then advances to operation 354 where multiple requests are received to access memory. As described above, a graphics controller may support multiple devices which on occasion need access to memory within the graphics controller. The method then advances to operation 356 where one of the multiple requests for access to the memory is granted based on the bit portion or bit locations associated with the multiple requests. As described above, a request associated with a highest significant bit portion will be granted access, while a request for a lower bit portion or bit location of data will be paused until the higher bit location access is completed. As described with regard to FIGS. 7A and 7B, the accesses to memory may be read accesses, write accesses, or some combination of the both. In one embodiment, the priorities assigned to the devices requesting access may be used to grant access in order to override the priority assigned to the bit locations being accessed. Alternatively, the access may be granted based on a priority assigned to a device which would override access granted based on bit position.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for preventing data corruption from being displayed during an underflow, comprising method operations of:
    writing data representing a first pixel across a plurality of segments within memory;
    writing data representing a second pixel across the plurality of segments, wherein corresponding bit locations for the data representing the first pixel and the data representing the second pixel are contiguous;
    requesting the data representing the first pixel;
    reading the data representing the first pixel in response to the requesting;
    determining whether the reading is completed for bits of the first pixel prior to the first pixel being displayed;
    substituting a portion of the data representing the first pixel when the reading is not completed prior to a display time for the first pixel; and
    presenting the first pixel with the substituted data portion, and
    wherein the method operation of substituting a portion of the data representing the first pixel when the reading is not completed prior to a display time for the first pixel includes,
        averaging a received portion of the data of the first pixel; and
        inserting a result of the averaging for the portion of the data.

2. The method of claim 1, wherein the plurality of segments are non-contiguous and uniformly spaced within the memory.

3. The method of claim 1, wherein the first and second pixels have 16 bits per pixel thereby resulting in 16 segments within the memory.

4. The method of claim 3, wherein a most significant bit for each of 16 pixels is stored in a first segment and corresponding successive bits for the respective 16 pixels are stored in successive segments.

5. The method of claim 1, wherein the method operation of reading the data representing the first pixel in response to the requesting includes,
reassembling the first pixel from data within the plurality of segments.

6. The method of claim 1, wherein the method operation of substituting a portion of the data representing the first pixel when the reading is not completed prior to a display time for the first pixel includes,
copying a last received bit of the first pixel for the portion of the data.

7. The method of claim 1, wherein the method operation of substituting a portion of the data representing the first pixel when the reading is not completed prior to a display time for the first pixel includes,
determining whether a received portion of the data is one of increasing or decreasing from a most significant bit position;
averaging a received portion of the data of the first pixel;
inserting a result of the averaging for a first bit of the portion of the data; and
modifying the result of the averaging for a next bit of the portion of the data based on whether the received portion of the data is one of increasing or decreasing.

8. A graphics controller, comprising:
a memory having,
a write first in first out (FIFO) region of the memory for receiving original pixel data;
a read FIFO region of the memory for accessing the original pixel data received through the write FIFO;
a memory controller having write assembly logic for rearranging the original pixel data received by the write FIFO for storage in the memory, the write assembly logic configured to write data representing a first pixel and a second pixel across a plurality of segments in the memory, wherein corresponding bit locations for the data representing the first pixel and the data representing the second pixel are contiguous; and
a display pipe for accessing pixel data in the read FIFO region, the pixel data being reassembled to the original pixel data within the read FIFO region;
the memory controller including a bandwidth limiting check module configured to determine whether the display pipe will be provided with the original pixel data in time to provide the original pixel data to a display panel; and
pixel substitution logic configured to substitute a portion of the original pixel data in response to the bandwidth limiting check module determining that the display pipe will not be provided with the original pixel data in entirety; and wherein
the pixel substitution logic substitutes a portion of the original pixel data by
averaging a received portion of the data of the first pixel; and
inserting a result of the averaging for the portion of the original pixel data.

9. The graphics controller of claim 8, wherein one of the plurality of segments contains a most significant bit for each of the first pixel and the second pixel.

10. The graphics controller of claim 8, wherein the pixel substitution logic copies a last received bit of the original pixel data for each missing bit of the original pixel data.

11. The graphics controller of claim 8, wherein the original pixel data has 16 bits per pixel and each bit of the 16 bits per pixel is stored in corresponding bit locations within 16 different segments in the memory.

12. The graphics controller of claim 8, wherein the graphics controller is incorporated into a cell phone.

13. A method for preventing data corruption from being displayed during an underflow, comprising method operations of:
writing data representing a first pixel across a plurality of segments within memory;
writing data representing a second pixel across the plurality of segments, wherein corresponding bit locations for the data representing the first pixel and the data representing the second pixel are contiguous;
requesting the data representing the first pixel;
reading the data representing the first pixel in response to the requesting;
determining whether the reading is completed for bits of the first pixel prior to the first pixel being displayed;
substituting a portion of the data representing the first pixel when the reading is not completed prior to a display time for the first pixel; and
presenting the first pixel with the substituted data portion; and
wherein the method operation of substituting a portion of the data representing the first pixel when the reading is not completed prior to a display time for the first pixel includes,
determining whether a received portion of the data is one of increasing or decreasing from a most significant bit position;
averaging a received portion of the data of the first pixel;
inserting a result of the averaging for a first bit of the portion of the data; and
modifying the result of the averaging for a next bit of the portion of the data based on whether the received portion of the data is one of increasing or decreasing.

* * * * *